N. A. LOCKWOOD.
FILTER PRESS EQUIPMENT.
APPLICATION FILED SEPT. 22, 1920.

1,390,531.

Patented Sept. 13, 1921.
3 SHEETS—SHEET 1.

WITNESS.
John B. Dade.

INVENTOR
N. A. Lockwood.
by Wilkinson & Giusta
his ATTORNEYS

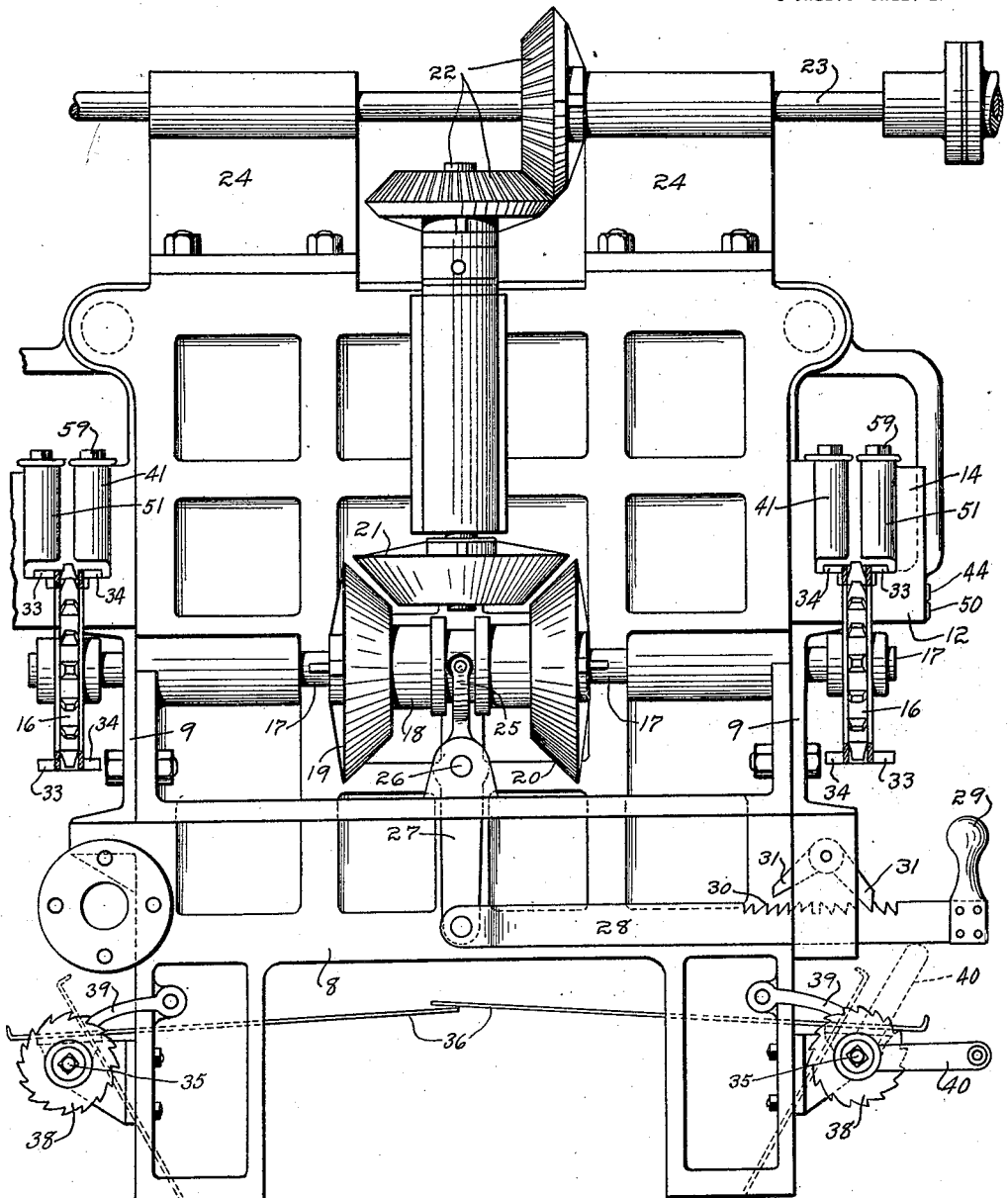

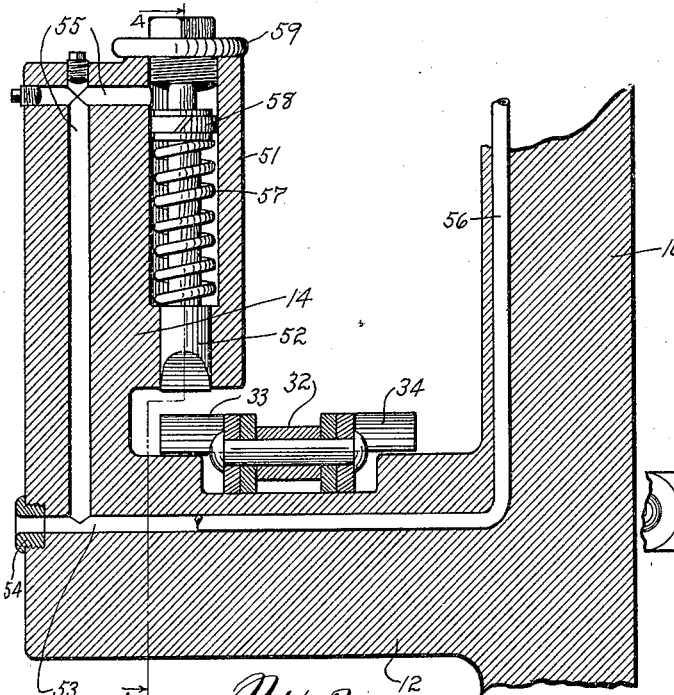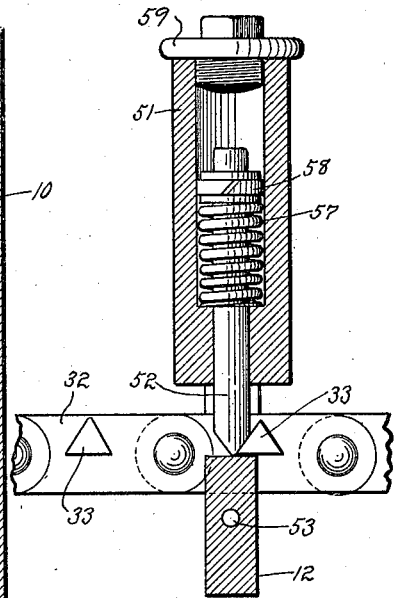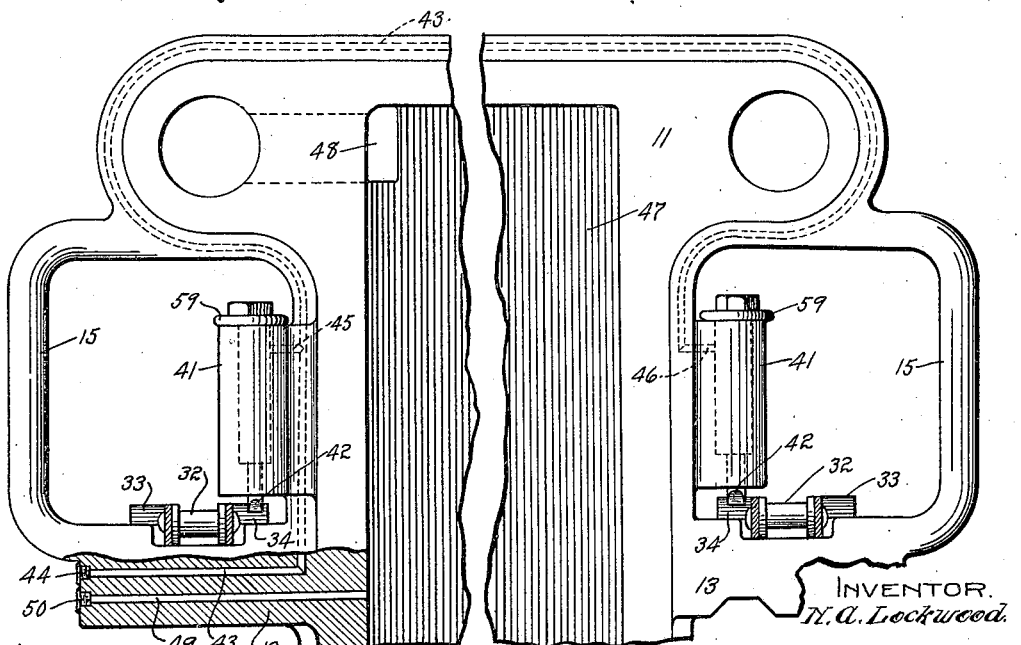

UNITED STATES PATENT OFFICE.

NELSON A. LOCKWOOD, OF OGDEN, UTAH.

FILTER-PRESS EQUIPMENT.

1,390,531.  Specification of Letters Patent.  Patented Sept. 13, 1921.

Application filed September 22, 1920. Serial No. 412,022.

*To all whom it may concern:*

Be it known that I, NELSON A. LOCKWOOD, a citizen of the United States, residing at Ogden, in the county of Weber and State of Utah, have invented certain new and useful Improvements in Filter-Press Equipments; and I do hereby declare the following to be a full, clear, and exact description of the invention, such as will enable others skilled in the art to which it appertains to make and use the same.

This invention relates to filter press equipment, and the improvements embody novel means for mechanically handling the filter units of pressure filters, of the hollow frame or plate and frame type, to alternately unseat and reseat the same periodically for cleaning purposes while displaced, and also for mechanically operating the drip pans thereof, as associated with such improved or analogous arrangements.

While the invention has been more particularly devised with reference to plate and frame filter presses as employed in the sugar industry, and for simplicity and brevity will be disclosed in that relation alone, still in actual applications it will be obvious that the improvements may likewise be expediently employed in other relations or industries, wherein operations are conducted on a large scale for the filtration of juices, oils or other liquids, by means of filter presses of the aforesaid type.

The general construction and functioning of these filter presses is well understood and, with relation to beet sugar juices for instance, that the separation of the juice from the contained lime and other impurities or foreign matter is effected by means of filter cloths interposed between the open faces of each hollow frame and its apposite juice plates, which cloths extend to the outer edges thereof to serve additionally as packing or gasket means between the hollow frames and juxtaposed plates to prevent any leakage.

It is also understood that the impure juices are introduced within each hollow cloth covered frame and flow outwardly against the juice plates, so that in the operations of cleaning, or discharging the accumulated lime cake from within the filter frames periodically, it is necessary to open up the press by moving or sliding each frame and plate on their supports a requisite distance, varying from eighteen to twenty-four inches, after the pressure has been released on the hydraulic or screw closing means. When the accumulations within all of the frames have been discharged, the hollow frames and juice plates are moved back to their closed positions one at a time, and pressure is again applied to hold them together in leak-tight relation.

As heretofore practised, this has always been done manually, and the sizes of the frames and plates are limited to that size which two men can handle. As a rule, the limit of size has been 36" x 36", one man standing on either side of the press for handling the frames and plates.

It follows that these conditions have proven to be very objectionable for various reasons, including the limitations in the sizes of presses employed and the necessity of at least two men to conduct the cleaning operations, all of which results not only in an increased cost of labor but also in a material loss of time in conducting the filtration operations generally, with a consequent lack of economical efficiency.

The primary aim of the instant invention, therefore, is to overcome such deficiencies by the installation of mechanically operating means for shifting the hollow frames and juice plates, and which will require the attention of only one operative.

This and other objects and advantages, however, will be so clearly apparent, as incidental to the following disclosure, that it would only be undesirable repetition to further enlarge upon the same initially, and with these prefacing remarks reference will now be immediately had to the accompanying drawings, illustrating a practical embodiment of the improvements, in which drawings—

Fig. 2 is an end elevation of the same;

Fig. 3 is a local sectional view through one end support of one of the hollow filter frames, the section being taken in the plane of the frame and showing an engaging plunger tooth, with cylinder therefor, associated with one of a side pair of endless sprocket chains;

Fig. 4 is a local sectional view taken along the line 4—4 of Fig. 3;

Figure 6:
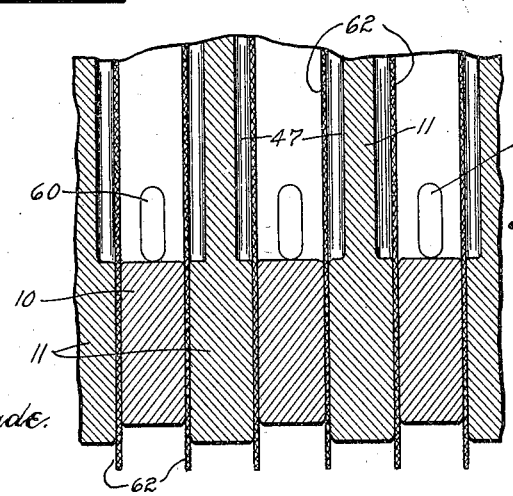

Fig. 5 is a broken away view, partly in section, in face elevation of one of the juice plates, with its pair of plunger teeth and cylinders therefor shown in association with said side pair of sprocket chains; and Fig. 6 is a fragmentary vertical sectional view through the lower portions of a group of said hollow frames and juice plates, the section being taken at right angles to the planes of the frames and plates.

Figure 1:
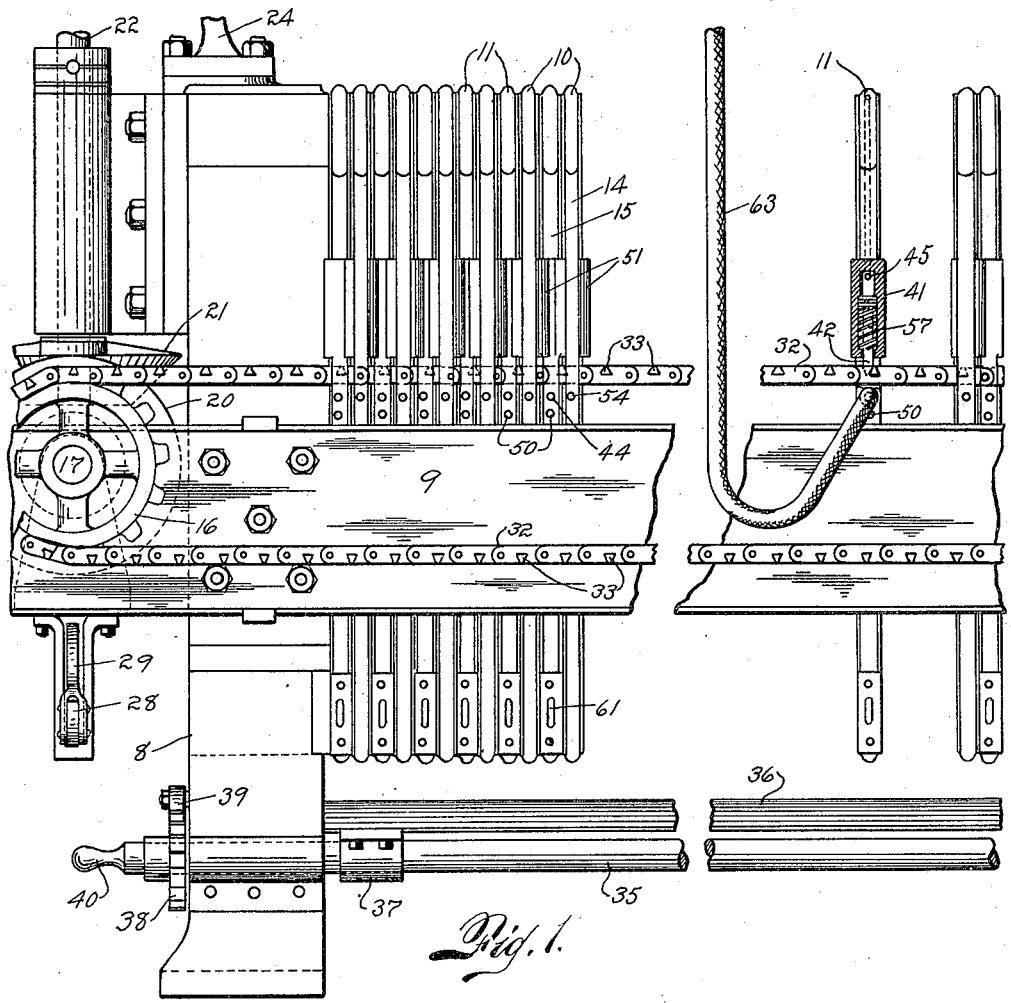
Figure 1 is a side elevational view of the forward portion of a frame and plate filter press equipped with the improvements, which view is partly broken away and is partly shown in section.

Referring first more particularly to Figs. 1 and 2, and briefly to the general structure of the frame and plate filter press, 8 indicates one end support of the structure, there being an analogous vertical support at the other end of the press, and extending longitudinally of these two end supports are a pair of substantially spaced side beams 9, between which are supported the laterally disposed hollow frames 10 and juice plates 11 that are slidingly mounted thereon by horizontal end projections 12 and 13, respectively, providing vertical extensions 14 and 15 which are spaced from the edge faces of their body portions. It is also to be understood that the right hand portion of the press and its end support, omitted from the drawings, provides the usual hydraulic or screw pressure means associated with the filter units, for closing them together in leak-tight relation.

The general construction and functioning of the hollow frames and the juice plates are the same as heretofore, excepting that they are specifically equipped with certain additional features, forming a part of this instant invention, and which will be hereinafter more fully set forth.

Before describing these features in detail, however, it may be preferable to first refer to other coöperating equipment of the reconstructed press as follows:—

16 are sprocket wheels, of which there are two, suitably mounted in pairs, at both ends of the press, the ones at the driving end being carried by a cross-shaft 17, having an intermediate shifting sleeve 18 slidingly keyed thereon and carrying reversely disposed driven friction wheels 19 and 20, for changing the direction of rotation, coöperating with an interposed driving friction wheel 21 associated with a driving train 22, the driving shaft 23 of which is suitably journaled on the press, as by the brackets 24, and may be driven by any suitable mechanism not shown.

The gear shift is accomplished, as will be obvious, by a lever having a bifurcated upper arm 25 straddling the sleeve 18, which lever is pivoted as at 26 and has a downwardly projecting arm 27 pivotally connected to an operating control, shown as a horizontal reciprocative bar 28 that may have a handle 29, and the upper edge face of which bar may be serrated as at 30 to provide ratchet teeth which are reversely disposed to be engaged by a double acting pivoted dog or pawl element 31.

The sets of sprocket wheels 16 are equipped with a side pair of sprocket chains 32, which are so disposed that their upper paths of travel will be slightly above the side beams 9, and these chains provide an endless spaced series of lateral lugs 33 and 34, which are so disposed between links as to project from opposite sides of each sprocket chain, and which are preferably of triangular form in cross-section.

35 designates rock shafts, one of which extends along each side of the press toward the bottom thereof, that function as tilting supports for a pair of overlapping drip pans 36, adapted to catch and convey any dripping juices to juice troughs or side launders not shown, which pans extend beneath the filter units and the outer portions of which are attached to the rock shafts by any suitable means such as elements 37.

One of the ends of each rock shaft carries a ratchet wheel 38 coöperating with a pawl 39, and each shaft may have a suitable crank arm or handle 40 for operating the pans to their normal horizontal positions, after they have been opened downwardly, as shown in dotted lines, during cleaning operations, which downward opening is effected by elevating the pivoted pawls 39 from engagement with their ratchet wheels 40.

Referring now more particularly to Fig. 5, as before stated, the juice plates are generally formed as heretofore, but with the following added features:—

Along both end edge faces of each plate, encompassed by the handle portion 15, is an enlarged vertical shoulder (corresponding in effect to the outer vertical shoulder 14 at each end of the hollow frames) bored to provide cylinders 41 containing a spring controlled plunger terminating at its lower end in a beveled tooth 42 for coaction, when set, with its inner complementary series of triangular lugs 34 of the sprocket chains. A pressure fluid conduit 43 is also shown as extending around the upper portion of the plate, providing a plug inlet opening 44 and portways 45 and 46 opening to the upper interior of the respective cylinders 41. These plates have the usual vertical corrugated or channeled faces 47 and a wash water portway 48, but in addition to the pressure fluid conduit 43 they may also be provided with a valve controlled pressure fluid bore 49 (the check valve therefor not being illustrated as obvious) having a plug inlet 50, and the other end of said bore 49 being in communication with said corrugated surfaces for a purpose hereinafter referred to.

Each hollow filter frame (see particularly Fig. 3) is analogously provided with a cylinder 51 at each side, the same being effected by vertically boring the shoulder extensions 14, and is likewise formed with a pressure fluid conduit 53, having a plug inlet 54 and branch portways 55 leading to the upper interior of the cylinders, each of which cylinders 51 houses a spring controlled plunger rod terminating in a lower beveled tooth 52 for coaction with the outer complementary series of triangular lugs 33 of the sprocket chains, it being noted that the cylinders 51 of the hollow frames are distanced substantially farther from the center of the frames relatively to the cylinders 41 of the juice plates.

In actual practice, the pressure fluid conduit 53 of the hollow frames, as well as the conduit 43 of the juice plates, could be satisfactorily formed by casting a suitably shaped tube directly in the body of each unit, as would be indicated at 56 of Fig. 3. Also, the spring control for each of the plunger teeth could be provided for as shown in Figs. 1, 3 and 4, wherein 57 is a coil spring encircling the plunger rod, which latter carries a ring-packed piston head 58 with its underneath face engaging the upper end of the coil spring, and 59 being a capping element for the cylinder bore.

There are conventionally shown in Figs. 1 and 6, respectively, the juice inlets 60 to the hollow frames 10, the juice run outs 61 from the juice plates 11, which juice run outs may discharge to the side troughs or launders, and the filter cloths 62 between the juice plates and hollow frames, all as heretofore practised, but at 63 there is also shown a pressure fluid flexible tubing, supplied from any suitable source, as plugged in the inlet opening 44 to the pressure fluid conduit 43 of one of the juice plates, to cause the plunger teeth 42 of that pair of cylinders 41 to descend into engagement with a pair of the triangular lugs 34 of the inner series on the sprocket chains.

From the foregoing replete description, it is believed that the operations and functionings of the improvements will be fairly apparent, but they may be further briefly recited as follows:—

Assuming that the sprocket wheels are being rotated to the left, in preparing to close the press up after cleaning, and that the tubing 63 has been coupled to the inlet 44 of one of the juice plates, as in Fig. 1, then the flow of the pressure fluid will have been around the conduit 43 (Fig. 5) and entering the cylinders 41, above their piston heads 58, will have forced the plunger teeth 42 down in front of a pair of the triangular lugs 34 of the sprocket chains moving also to the left, when the juice plate will be caused to travel in a like direction until it abuts the last hollow frame 10 of the left hand group of units, whereupon the flexible tube 63 is withdrawn to allow the springs to retract or elevate the plunger teeth 42 from engagement with their driving lugs 34, as will be obvious. The triangular shape of the lugs and the correspondingly beveled teeth would also tend to elevate the latter, at the end of the juice plate's travel, even though the flexible tubing was not instantly disconnected at that position.

The flexible tube is then applied to the inlet opening 54 of the following hollow frame in the series, whereupon a like movement will be imparted to the latter, as will be obvious from Fig. 4, and the same cycle of operations is continued until all of the hollow frames 10 and juice plates 11 have been moved to the left, whereupon the hydraulic or screw pressure means (at the right hand of the press and not shown) is brought into operation to compactly close up all of the units together in substantially leak-tight relation, prior to further filtration operations.

To open up the press, for cleaning purposes, it is obvious that the exact reverse cycle of operations is conducted, excepting that as each juice plate 11 has been displaced, the filter cloths 62, which are hung over the juice plates after the fashion of a downwardly opening bag, may be blown clean of any adhering cake on the outside thereof, or on the sides facing the interior of the frames, by attaching the flexible tube 63 to the inlet opening 50 of the conduit 49, which will conduct the pressure fluid to the corrugated faces of the juice plate enveloped by the filter cloths or bag, thus tending to inflate the latter.

While I have thus made a complete disclosure of a practical embodiment of my improvements, it may later be found to be desirable or expedient to make minor alterations or substitutions in the form and structural arrangement of elements, but without departing from the spirit of the invention. For instance, while I contemplate at present using compressed air as the pressure fluid in the line 63, it is obvious that any other character of pressure fluid might be employed, such as steam or water, and in fact mechanical or electrical means might well be employed for actuating the plunger teeth, although the detailed arrangement might be a trifle more complex. Furthermore, I have in mind the idea of providing for the automatic detachment of the flexible tubing at the end of the travel of each unit, or otherwise releasing the plunger teeth, but these are details not material to the instant broader invention, and will not be entered into.

It is to be understood, therefore, that I do not wish to unnecessarily limit myself to the exact details disclosed, excepting as they may come within the purview of the claims, contemplating a fair interpretation thereof in the light of the specification, if necessary, and understood equivalents.

What I do claim, as new and patentable, is:—

1. In filter presses embodying a series of filter units operative therealong, for opening and closing the press, the combination of conveyer elements movably associated with said filter units, for shifting the latter in reverse directions as desired, means for operating said conveyer elements, and means for detachably coupling said filter units with said conveyer elements, substantially as described.

2. In filter presses embodying a series of filter units operative therealong, for opening and closing the press, the combination of conveyer elements movably associated with said filter units, for shifting the latter in reverse directions as desired, means for operating said conveyer elements, and means carried by each of said filter units and operative to detachably couple the same with said conveyer elements, substantially as described.

3. In filter presses embodying a series of filter units operative therealong, for opening and closing the press, the combination of conveyer elements movably associated with said filter units and providing series of engaging means for shifting said units in reverse directions as desired, and retractile plunger elements carried by each of said filter units and operative to detachably couple the same in association with said conveyor elements through said engaging means thereof, substantially as described.

4. In filter presses embodying a series of filter units operative therealong, for opening and closing the press, the combination of conveyer elements movably associated with said filter units and providing series of engaging means for shifting said units in reverse directions as desired, and pressure fluid actuated rectractile plunger elements carried by each of said filter units for detachably coupling the same with said conveyer elements through said engaging means thereof, substantially as described.

5. In filter presses embodying a series of filter units operative therealong, for opening and closing the press, the combination of a pair of longitudinally disposed side conveyer elements movably associated with said filter units and each providing a series of laterally projecting driving lugs, for shifting said units in reverse directions as desired, and retractile plunger elements carried by each of said filter units, one at each side thereof, and operative to be detachably engaged by said driving lugs, substantially as described.

6. In filter presses embodying a series of filter units operative therealong, for opening and closing the press, the combination of a pair of longitudinally disposed side conveyer elements movably associated with said filter units and each providing a series of laterally projecting driving lugs, for shifting said units in reverse directions as desired, and retractile pressure fluid actuated plunger elements carried by each of said filter units, one at each side thereof, and operative to be detachably engaged by said driving lugs, substantially as described.

7. In filter presses embodying a series of filter units operative therealong, for opening and closing the press, the combination of a pair of longitudinally disposed side conveyer elements movably associated with said units and each providing a series of laterally projecting driving lugs which have beveled engaging faces, for shifting said units in reverse directions as desired, and retractile plunger teeth, having beveled engaging faces, carried by each of said units, one at each side thereof, and operative to be detachably engaged by said driving lugs, substantially as described.

8. In filter presses embodying a series of filter units operative therealong, for opening and closing the press, the combination of a pair of longitudinally disposed endless side sprocket chains associated with said units and each providing a series of driving parts, for shifting said units in reverse directions as desired, actuating mechanism for said sprocket chains, and retractile plunger elements carried by each of said units, one at each side thereof, and operative to be detachably engaged by the driving parts of said sprocket chains, substantially as described.

9. In filter presses embodying a series of filter units operative therealong, for opening and closing the press, the combination of a pair of longitudinally disposed side conveyer elements movably associated with said units and each providing an outer and an inner series of laterally projecting driving lugs, for shifting said units in reverse directions as desired, actuating mechanism for said conveyer elements, and retractile plunger elements carried in pairs by each of said units, one at each side thereof, with the pair of plunger elements of one unit being substantially distanced laterally relatively to the pair of plunger elements of alternating units, and the said plunger elements being operative to be detachably engaged by a complementary one of said driving lugs, substantially as described.

10. As elements of filter presses of the character set forth, hollow filter frame units and juice plate units, each of which provides suitably operated elements for detachable engagement with shifting means associated therewith when assembled in the press, substantially as described.

11. As elements of filter presses of the character set forth, hollow filter frame units and juice plate units, each of which provides suitably operated plunger elements for detachable engagement with shifting means associated therewith when assembled in the press, substantially as described.

12. As elements of filter presses of the character set forth, hollow filter frame units and juice plate units, each of which provides cylinders, in communication with a pressure fluid conduit, formed in each of said units, with a retractile plunger element disposed in each cylinder, for detachable engagement with shifting means associated therewith, when the units are assembled in the press, substantially as described.

13. As elements of filter presses of the character set forth, hollow filter frame units and juice plate units, the said juice plate units having channeled faces, each of said units providing cylinders, in communication with a pressure fluid conduit, formed in each of said units, a second pressure fluid conduit being formed in each of said juice plate units that leads to the channeled faces thereof, with a retractile plunger element disposed in each of said cylinders, for detachable engagement with shifting means associated therewith, when the units are assembled in the press, substantially as described.

14. In filter presses embodying a series of filter units operative therealong, the combination of a pair of longitudinally disposed side conveyers, each of which provides a series of driving parts, actuating mechanism for said conveyers, a pair of side cylinders carried by each of said units, with a pressure fluid conduit, formed in each unit, that communicates with the cylinders thereof and provides an inlet opening, a retractile plunger element disposed in each of said cylinders and operable into detachable engagement with a complementary driving part of said conveyers, and a supply tube for delivering pressure fluid to the inlet openings of said conduits as desired, substantially as described.

15. In filter presses embodying a series of alternating juice plates, having channeled faces, and hollow filter frames, with filter cloths stretched between said plates and frames and all of which are operative along the press, the combination of a pair of longitudinally disposed side conveyers, each of which provides a series of driving parts, actuating mechanism for said conveyers, a pair of side cylinders carried by each of said plate and frame units, with a pressure fluid conduit, formed in each unit, that communicates with the cylinders thereof, and with a second pressure fluid conduit formed in each of said juice plate units, leading to the channeled faces thereof, each of said conduits being provided with an inlet opening, a retractile plunger element disposed in each of said cylinders and operable into detachable engagement with a complementary driving part of said carriers, and a suitably supplied detachable tube for delivering pressure fluid to the inlet openings of said conduits as desired, substantially as described.

16. As elements of filter presses of the character set forth, embodying a series of filter units operative therealong, a pair of drip pan members extending longitudinally underneath said filter units which are tiltingly supported toward their outer ends and are adapted to overlap at their inner ends, substantially as described.

17. In filter presses of the character set forth, embodying a series of filter units operative therealong, the combination of a pair of rock shafts extending longitudinally below said filter units toward the outer ends thereof, a pair of elongated drip pan members extending longitudinally underneath said filter units, the outer ends of each of said drip pan members being secured to a complementary one of said rock shafts with their inner ends adapted to overlap when elevated to a horizontal position, means for actuating said rock shafts, and means for controlling the actuation of said rock shafts, substantially as described.

In testimony whereof, I affix my signature.

NELSON A. LOCKWOOD.